United States Patent [19]

Unruh et al.

[11] Patent Number: 5,716,551
[45] Date of Patent: Feb. 10, 1998

[54] STATIC DISSIPATIVE COMPOSITION AND PROCESS FOR STATIC DISSPATIVE COATINGS

[75] Inventors: Greg Roland Unruh, Randall; Jean Gentleman-Wynn, Potter, both of Tex.

[73] Assignee: Tech Spray, Inc., Amarillo, Tex.

[21] Appl. No.: 599,295

[22] Filed: Feb. 9, 1996

[51] Int. Cl.$^6$ .............................. H01B 1/124; C08F 2/48
[52] U.S. Cl. ..................... 252/500; 427/487; 427/508; 427/516; 522/6; 522/74; 522/83; 522/109
[58] Field of Search ..................... 252/500, 518; 427/487, 508, 516; 522/6, 74, 75, 79, 83, 109

[56] References Cited

U.S. PATENT DOCUMENTS

| | | | |
|---|---|---|---|
| 4,293,452 | 10/1981 | Fox et al. | 252/518 |
| 4,711,742 | 12/1987 | Jen et al. | 252/500 |
| 4,755,326 | 7/1988 | Liepins et al. | 252/519 |
| 4,872,910 | 10/1989 | Eshleman et al. | 106/3 |
| 5,420,171 | 5/1995 | Unruh | 522/44 |
| 5,462,696 | 10/1995 | McGinniss et al. | 252/500 |

OTHER PUBLICATIONS

Wu Chang Pei et al, "Study on Preparation of UV Cross-Linking Films of Polyurethane-LiClO$_4$ Complexes and Their Ionic Conductivity,"*Acta Physica Sinica (Overseas Edition)*, vol. 2, No. 11, pp. 841–849, Science Press, Nov. 1993;

*Host Guest Complex Chemistry Macrocycles; Synthesis, Structures, Applications*, pp. 1–41, F. Vogtle et al, editors, Springer–Verlag, New York, 1985;.

*Primary Examiner*—Paul Lieberman
*Assistant Examiner*—M. Kopec
*Attorney, Agent, or Firm*—William D. Jackson; Locke Purnell Rain Harrell

[57] ABSTRACT

A U.V. curable composition for application to a substrate surface to provide a static dissipative coating which comprises a conductive matrix constituent having a crown type ligand selected from the group consisting of podands, coronands and cryptands in a guest/host relationship with a conductive dopant moiety. Such ligands included those provided by functionalized podands and functionalized coronands. The formulation further includes a polymer matrix constituent formed of a base oligomer system and a crosslinking agent which is reactive with the base oligomer system to form a crosslinked resin matrix which incorporates the conductive matrix constituent. A low viscosity diluent functions as a solvating liquid for the crosslinking agent and the base oligomer system. The formulation further includes a photoinitiator of the free radical or cationic type to initiate polymerization of the composition upon the application of electromagnetic radiation in the ultraviolet range. The low viscosity diluent liquid may be reactive with the base oligomer system and the crosslinking agent when it is cured under UV radiation. A specific conductive matrix constituent is an acrylated or unsubstituted coronand in a guest/host relationship with an alkali metal ion selected from the group consisting of lithium, sodium and potassium. A method for treating a solid surface to produce a static dissipative surface by application of a clear liquid coating material comprising a conductive matrix constituent and a conductive dopant moiety and other components as described above. The coating liquid is applied to a substrate surface to provide a liquid film on the surface and is irradiated with ultraviolet radiation to effect crosslinking of the polymerizable matrix constituent to provide a cured transparent film having a surface resistivity of $10^5$–$10^{14}$ ohms per square.

35 Claims, No Drawings

STATIC DISSIPATIVE COMPOSITION AND PROCESS FOR STATIC DISSPATIVE COATINGS

FIELD OF THE INVENTION

This invention relates to UV curable static dissipative coatings of films and more particularly to compositions and processes for producing such coatings effectively and rapidly, as well as, substrate materials provided with such coatings.

BACKGROUND OF THE INVENTION

There are various applications in which so-called antistatic surfaces are desirable. Such applications are found in the manufacturing and use of electronic equipment where sensitive electrical components can have static charge accumulation which can interfere with their operation or actually cause damage to such components. Similarly in the use or manufacture of electronic equipment, accumulation of static charges on substrate surfaces such as floors, workbenches, cabinets and the like which might be imparted to such equipment in the course of normal operations, can lead to serious problems.

Various formulations incorporating complexes formed from metal salts in a polymer matrix have been proposed in order to provide electrically conductive surface layers or films which can function to prevent the buildup of static charges on surfaces or dissipate charges transferred from other bodies. The metal ions may be introduced by means of a suitable dopant moiety which imparts the desired conductive characteristics to the polymer matrix. The use of such dopants to introduce trace impurities into polymer matrixes or structures are well known in the art.

An antistatic polymeric composition useful as a floor polish is disclosed in U.S. Pat. No. 4,872,910 to Eshleman et al. Here, various alkali metal or alkali earth metal salts are employed in conjunction with acryloid type polymer materials in a polyalkylene oxide complex with the metal ions. By way of example, polyethylene oxide or polypropylene oxide can be used to form a complex with various halides, thiocyanates, acetates or nitrates of lithium, sodium or potassium or magnesium, calcium or strontium. Polymers and surfactants can be incorporated into the formulation as well as the alkali metal or alkali earth metal-polyalkylene oxide complex. For example, polymers which can be incorporated into the Eshleman et al formulation include polyurethanes, acrylate copolymers, acrylic acid terpolymers, polyvinyl alcohol, polyethylene glycol, styrene-maleic anhydride copolymers, together with non-ionic surfactants and plasticizers and various other additives. In the Eshleman formulation the preferred metal salt is a lithium salt, specifically, lithium chloride.

Another formulation, in which polymers are treated with an electron donor dopant to provide electrically conductive films, is disclosed in U.S. Pat. No. 4,755,326 to Liepina et al. Here an electride or alkalide, characterized respectively as a salt in which the anion is a trapped electron or an alkali metal anion, incorporating "trapping agent" which may be a podand, cryptand or coronand, specifically, a crown-ether such as 18-crown-6 is employed. While in the Liepina formulation, the preferred metal for use in the electron donor dopant is cesium, other alkali metals are identified as useful and include lithium, sodium, potassium and rubidium. In addition, lithium may be used in conjunction with cesium.

The polymer which is subject to the dopant may be polyactylene or a polyaromatic heterocyclic polymer which in the unmodified (non-doped state) is electrically non-conductive. Polymers disclosed as useful in Liepina include polyquinoxalines, polybenzimidazoles, polybenzoxazoles, polybenzthiazoles, polyoxadiazoles, polybenztriazoles and polysulfodiazoles. Specifically, disclosed are polymer structures derived from Pyrrone I, Pyrrone II, and polyphenylquinoxaline. The Liepina formulation involves a doping procedure which is carried out in a vacuum system, followed by vacuum distillation and drying to effect the curing action, resulting in cured film thicknesses ranging from 50 to 100 microns and ranging as reported in Table I of the patent from bright purple to black.

U.S. Pat. No. 4,711,742 to Jen et al discloses solutions having as ingredients, film forming homopolymers or copolymers, organic solvents and electron acceptor dopant solutes although electron donor dopants can also be used. Numerous polymers and organic solvents are disclosed in Jen et al as useful in forming the conductive films. Such polymers include various polymers of the teropentacyclic such as furans and thiofurons substituted with alkyl, aryl, or thio-, carboxyl, or sulfonic acid substituted alkyls or aryls or other function groups. Various solvents included sulfones, alkyl or alkyl aryl sulfonates, furans, ethers, and aliphatic or aromatic hydrocarbon solvents. A large number of electron acceptor dopants are disclosed including various halogens, chlorates, nitrates, sulfites, tri- and tetra-halides, and perchlorates, including lithium perchlorate.

SUMMARY OF THE INVENTION

In accordance with the present invention, there is provided a composition for application to a substrate surface to provide a static dissipative coating which is curable by application of electromagnetic radiation in the ultraviolet range. The composition of the present invention comprises a conductive matrix constituent having a crown type ligand selected from the group consisting of podands, coronands and cryptands in a guest/host relationship with a conductive dopant moiety. Preferred ligands are provided by functionalized podands and functionalized coronands. The formulation further includes a polymer matrix constituent formed of a base oligomer system and a crosslinking agent. The crosslinking agent is reactive with the base oligomer system to form a crosslinked resin matrix which incorporates the conductive matrix constituent. A low viscosity diluent functions as a solvating liquid for the crosslinking agent and the base oligomer system. The formulation further includes a photoinitiator of the free radical or cationic type to initiate polymerization of the composition upon the application of electromagnetic radiation in the ultraviolet range. The formulation has a cure time under UV radiation of no more than three minutes, preferably no more than one-half minute.

In a preferred embodiment of the invention, the low viscosity diluent liquid is reactive with the base oligomer system and the crosslinking agent when it is cured under UV radiation. A preferred conductive matrix constituent is an acrylated or unsubstituted coronand in a guest/host relationship with an alkali metal ion preferably selected from the group consisting of lithium, sodium and potassium. More specifically, the coronand is a crown ether, which may be acrylated or unsubstituted, having an average cavity diameter within the range 1.2–3.2 Å. By varying the ratio of salt to the crown ether, the stoichiometry of the complex can be controlled. In order to provide good electrical conductivity of the ultimately cured film and depending on the crown ethers and the salts, the ratio of the cation to the crown ether can be 1:1, 1:2, 2:1 and 3:2. A preferred coronand is a crown ether or a substituted crown ether having from 4–6 donor oxygen atoms. Where substituted crown ethers are employed, they preferably are mono- or di-substituted cycloalkyl or aromatic substituted crown ethers.

In a further aspect of the present invention, there is provided a method for treating a solid surface to produce a static dissipative surface. This method comprises the provision of a clear liquid coating material comprising a conductive matrix constituent selected from the group consisting of podands, coronands and cryptands in a guest/host relationship with a conductive dopant moiety of the type described above. The coating fluid further includes a polymerizable matrix constituent and a diluent which functions as a carrier liquid for the matrix constituent and the conductive and polymerizable matrix constituents. The coating liquid is applied to a substrate surface to provide a liquid film on the surface. This film is irradiated with ultraviolet radiation in an intensity within the range of 200–400 mw/cm$^2$ to effect crosslinking of the polymerizable matrix constituent to provide a cured transparent film having a surface resistivity of $10^5$–$10^{14}$ ohms per square. Preferably, the liquid formulation has a viscosity of no more than 1,000 cps. It further contains a surface active agent to provide a liquid/solid interfacial tension between the coating liquid and the substrate surface of no more than 20 dynes/cm and is applied by spraying through a suitable nozzle.

In yet a further embodiment of the invention, there is provided a anti-static structure comprising a solid substrate surface material having a boundary surface and a static dissipative film disposed on the boundary surface. The film comprises a polymer structure disposed on the surface and conductive matrix incorporated in the polymer structure. The polymer structure comprises a repeating crown type ligand structure as described above in a guest/host relationship with an entrapped cationic moiety. This configuration provides an electrically conductive network through the polymer structure. The static dissipative film is transparent to visible light and has a thickness within the range of 1–250 mils.

DETAILED DESCRIPTION OF THE INVENTION

The present invention provides a film forming composition which can be readily and rapidly cured by the application of ultraviolet light to provide a thin, high conductive film which readily adheres to a wide range of substrate surfaces. Alternatively, a non-adhering film can be formed for use in providing a component part for electronic components. Also, while a primary application of the invention is in the formation of relatively thin films ranging down to a thickness of 1–2 microns, the formulation of the present invention can be formed or cast in relatively thick members which can be used in providing static dissipative structural members for use in electronic components and the like.

As described below, the composition of the present invention normally will be formulated so that it adheres to an underlying substrate which can be formed of wood, plastic or metal. An adhesion promoter normally will be added for this purpose. The various factors which will influence the adhesion of a UV crosslinked film to a substrate can be characterized as pre-curing factors such as the wettability of the substrate by the liquid formulation (which would depend upon the viscosity of the formulation and the interfacial tension between the formulation and the substrate surface), whereas factors such as shrinkage of the film during curing can affect post-curing adhesion. Other factors such as the nature of the substrate surface and chemical or physical interactions between the coating material and the substrate can affect both pre-curing and post-curing adhesion. Substrate adhesion, of course, is not a factor where relatively thick sheets are formed to provide structural members. Normally, an adhered film will have a thickness within the range of 10–100 microns, whereas a relatively thick film such as used in structural components, which can be adhered or non-adhered to a substrate, may have a thickness ranging from the thickness of an adhered film up to ⅛" or even more.

The present invention involves the formulation of a solid polyelectrolyte in which a dopant moiety is employed to provide an ionic complex with an organic compound in a polymeric structure. The polymeric structure incorporates oligomers or monomers which can be polymerized and crosslinked by ultraviolet light throughout the ultraviolet range or in any one or more of the A, B or C regions. So-called solid electrolyte polymer complexes are known in the art and can be formed from various inorganic salts, usually alkali metal or alkali earth metal salts. An example of such complexes are those formed from lithium with the oxygen atom of ether linkages or carbonyl groups as disclosed in Wu Chang Pei et al, *Acta Physica Sinica (Overseas Edition)*, Vol. 2, No. 11, pp. 841–849, Science Press, November 1993, the entire disclosure of which is incorporated herein by reference. The Chang Pei et al paper discloses the formation of complexes of polyurethane with lithium perchlorate, with crosslinking induced by ultraviolet radiation. A polyurethane oligomer was prepared by reacting polyethylene glycol with 2,4-tolyl-di-isocyanate followed by reaction with hydroxypropyl acrylate in a mole ratio of acrylate to glycol of 4:1. The polyurethane resin was mixed with an ethanol solution of lithium perchlorate which after drying under vacuum to evaporate the ethanol was then exposed to ultraviolet radiation under nitrogen flow to yield films about 0.25 mm in thickness. Experimental work in Chang-pei et al shows a decrease in crystallinity with increasing lithium concentration with the complexation action between the lithium ion and the polymer segments inhibiting orientation of polymers chains in order. The experimental work here further shows a decrease in conductivity after the salt concentration is increased from an intermediate level, possibly because the lithium ion enters into a crosslinking reaction.

In the present invention, a conductive coating composition is formed through the use of a conductive matrix incorporated within a polymer matrix in which a conductive moiety is complexed with an encapsulating ligand structure. As indicated by the aforementioned patent to Jen et al, the use of electron acceptor dopants to impart electrical conductivity in an organic structural matrix is in itself known in the art and various oxidizing agents known in the art and which are compatible with the coronand or other complexing ligand can be employed in carrying out the present invention. More particularly as described in greater detail below, the dopant should be matched with the ligand structure and the ligand structure in turn should be matched with the polymeric matrix constituent in order to arrive at the film forming composition. Suitable dopants for use in carrying out the invention include various Lewis acids which function to enter into an oxidation reaction with the crown type ligand moiety to form a conductive matrix. The ligands employed in carrying out the present invention may included acrylate functionalized podands, cryptands or coronands, with the latter being preferred. Suitable podands, cryptands and coronands are included within those described in the aforementioned patent to Liepina et al.

As is known by those skilled in the art, podands are multidentate acyclical ligands having the general formula:

[1]

wherein D is a donor atom and n is the number of repeating donor atoms. Podands function in a similar manner to the cyclic coronands and cryptands by forming nearly cyclic shapes. A typical podand having oxygen as donor atoms separated by ethylene groups and having methyl terminating groups is shown by the formula:

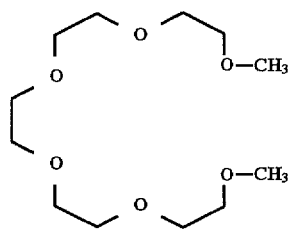

[2]

Coronands are multidentate monocyclic ligands without limitation on the type of donor atoms available and have the general formula:

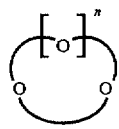

[3]

wherein D is a donor atom, n is the number of repeating donor atoms, and ⁀ is a chain segment without donor atoms. As discussed below, the predominant donors atoms are oxygen atoms, although coronands with mixed donor atoms in the cyclic framework are known in the art. As an example, a specific coronand with oxygen, nitrogen and sulfur donor atoms separated by ethylene groups is shown in the formula:

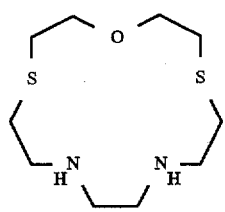

[4]

As described in greater detail below, the coronands are preferred for use in carrying out the present invention. The preferred coronands are the crown ethers which contain oxygen as donor atoms, the cyclic structure linking ethylene groups as indicated by the following structure,

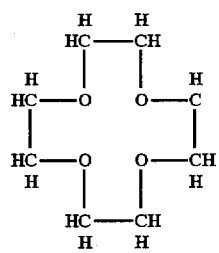

[5]

or, more simply, by the following designation:

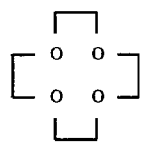

[6]

These closed chained compounds or crown ethers are characteristically described by the total number of carbon and oxygen atoms and the number of oxygen atoms linking the carbon atom segments. Thus a crown ether comprising a cyclic polyethylene ether structure of 4 ethylene groups bridging 4 oxygen atoms as shown by the above structure is identified as a 12-crown-4 or more briefly, 12C4. Similarly, a crown ether comprised of 6 oxygen donor atoms linking 6 ethylene groups as shown by the following structure is identified as 18-crown-6:

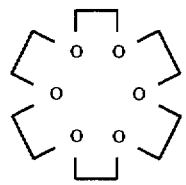

[7]

Cryptands are multidentate oligocyclic spherical ligands having a ring structure which has been bridged by a chain containing donor atoms and which is joined to the ring by bridgehead atoms. Cryptands have the general formula:

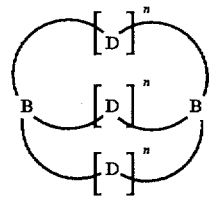

[8]

wherein D is a donor atom, n is the number repeating donor atoms, and B is a bridgehead atom, typically nitrogen resulting from precursor amino groups. A specific cryptand having oxygen donor atoms and nitrogen as the bridgehead atoms is shown by the formula:

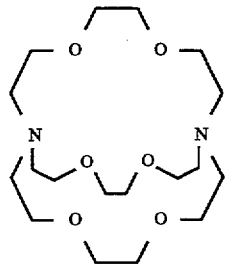

[9]

The crown type ligand moiety can be matched in terms of its structure with the dopant ion depending upon the size of the dopant cation in relation to the cavity size of the crown ether or other encapsulating ligand structure. By way of example, the relatively small lithium cation can be accommodated in the $C_8H_{16}O_4$ crown ether, 12-crown-4. Where the sodium ion is the dopant moiety, a crown ether such as 15-crown-4 having a larger cavity diameter may be employed and for the yet larger potassium cation, a crown ether such as 18-crown-6 may be called for.

The particular crown ether or other ligand structure appropriate for a particular cationic moiety can be determined based upon the cavity diameter of the particular ligand structure involved and the cation diameter. Both dimensions are readily available or can be determined by suitable procedures such as NMR analysis or, for a particular ligand structure, by crystallographic calculations based upon the interatomic bond distances and bond angles.

The podands, cryptands and coronands employed in the present invention can be substituted or unsubstituted and where substituted, may be substituted with alkyl groups, aromatic groups or saturated cycloalkyl groups or with another crown type ligand structure. For example, a coronand may be linked to another coronand through a bridging atom or group such as an alkylene group or a heterocyclic ring structure, including specifically, various heteroaromatic ring structures incorporating nitrogen, oxygen or sulfur atoms. The most commonly available ligand structures are condensed ring structures in which the substituents, the condensed ring aromatic or cycloalkyl groups, share ring atoms with the carbon atoms of the ethylene bridging groups of the crown ether or ligand moiety. Examples of such substituted ligand structures includes derivatives of 12-crown-4 such as benzo-12-crown-4, of 15-crown-4 such as cyclohexanol-15-crown-5, benzo-15-crown-5, dicyclohexano-15-crown-5, and dibenzo-15-crown-5, and of 18-crown-6 such as dicyclohexano-18-crown-6 and dibenzo-18-crown-6. Although not a requirement for the present invention, the disubstituted ligand structures will normally be substituted in a generally balanced arrangement about the central ligand structure. Thus, by way of example, dibenzo-18-crown-6 will normally be substituted as shown by the following structural formula:

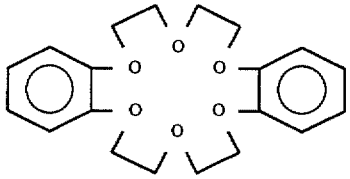

[10]

The preferred isomer of dicyclohexano-15-crown-5 is characterized by the following structural formula:

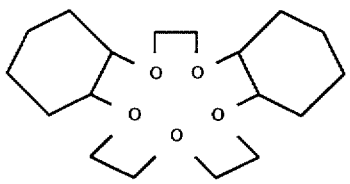

[11]

As noted previously, crown ethers or other coronands, cryptands or podands can be linked through non condensed ring structures as may be provided by donor heteroatoms such as nitrogen or sulfur. These and other crown type ligand structures which can be employed in providing the conductive matrix constituent of the present invention such as found in *Host Guest Complex Chemistry Macrocycles; Synthesis, Structures, Applications*, F. Vogtle et al, editors, Springer-Verlag, New York, 1985 and more specifically, the section entitled *Crown Type Compounds*, pp. 1–41, the entire disclosure of which is incorporated herein by reference. While heteroatoms can be employed to provide bridging structures in multisight crown compounds, it is preferred that the donor atoms be predominately oxygen atoms. As a practical matter, the preferred host structures will take the form of compounds in which only oxygen atoms are present as donor atoms such as in the crown ethers or substituted crown ethers as described above.

As discussed earlier, the crown ethers are the preferred ligand structure for use in the present invention. In yet a further embodiment of the invention, it is preferred to employ crown ethers which are acrylate functionalized for ultra-violet polymerization so that the ligand structures enter into the polymeric structure in a cross-linked relationship. Thus, the crown ether in a 12-crown-4 described above, may be acrylate functionalized for ultraviolet polymerization to provide the following structures:

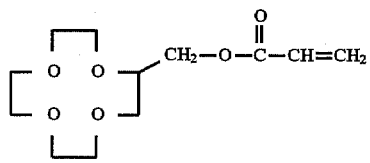

[12(a)]

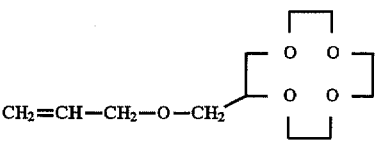

[12(b)]

Using the shorthand designation, structures 12(a) and 12(b) can be shown by structures, 13(a) and 13(b), respectively, as follows:

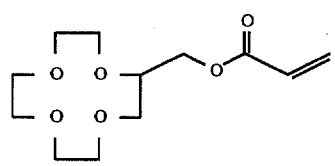

[13(a)]

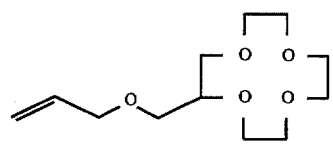

[13(b)]

in which the component $\digamma$ indicates the terminal vinyl group.

The corresponding di- or mono-substituted 12-crown-4's or the 14-4, 15-5, 18-6 and other crown ethers of the type described herein either unsubstituted or substituted such as the benzo and cyclohexano and dicyclohexano and dibenzo derivatives can similarly be functionalized as described above with respect to 12-crown-4.

Podands of the type described above can also be acrylate functionalized in a similar manner. In this case, one of the terminal methyl groups can be replaced by an acrylate ester group as follows. The acrylate functionalized podand can be characterized by the following generic formula:

[14]

in which n is within the range of 10–30.

While monofunctionalized ligand structures will usually be preferred, polyfunctionalized structures can also be employed particularly in the case of relatively high molecular weight crown structures. For example, a compound such as 18-crown-6 or dibenzo-18-crown-6 may be polyfunctionalized with vinyl groups thus 18-crown-6 may be substituted with vinyl groups on opposing carbon atoms such as indicated by the following structure:

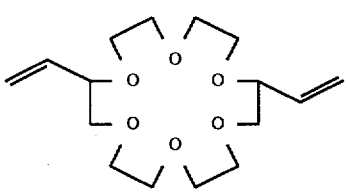

[15]

The conductive dopant moiety employed in conjunction with the crown type ligand may be of any suitable type which enters into a guest/host relationship with the ligand structure when ultimately incorporated into the polymeric matrix. Thus, the dopant employed in formulating the conductive matrix constituent may be an electron acceptor, for example, of the type disclosed in the aforementioned Jen and Eshleman et al patents, which provides a cationic species which entraps within the cavity provided by the crown type ligand structure. The dopant preferably is provided by an alkali metal based Lewis acid having an alkali metal of appropriate atomic diameter such that the ligand structure forms a stable lipophilic complex with the charged hydrophilic species provided by the dopant. Preferred are lithium, sodium and potassium based dopants. However, the alkali earth metals can also be employed, as well as transition metals of appropriate atomic diameter such as cerium, copper, nickle, silver and zirconium.

As indicated previously, the dopant and the ligand structure must be compatible to provide an appropriate relationship between the cavity size of the host ligand and the ionic diameter of the guest cation. The spacial relationship of the ionophores which form stable lipophilic complexes with the hydrophilic species provided by the alkali metal or alkali earth metal (or other cationic species) is addressed in the section entitled, *Structural Chemistry of Natural and Synthetic Ionophores and their Complexes with Cations* found in the aforementioned Vogtle et al, *Host Guest Complex Chemistry Macrocycles Synthesis Structures Applications*, specifically at pp. 45–117, the entire disclosure of which is incorporated herein by reference. By way of example, the atomic radii and charge densities of the alkali metal and alkali earth metal cations are presented in Table 1 (pp. 50) of Vogtle et al and these can be matched to the cavity diameter of the host ionophore as shown for example at pp. 18 and 19 of Vogtle et al. Suitable dopants which may be employed in carrying out the present invention include chlorine, bromine, iodine, ceric ammonium nitrate, copper perchlorate, lithium perchlorate, lithium triflate, lithium thiocyanate, lithium trifluoroacetate, lithium persulfate, nickel perchlorate, phosphorus oxychloride, phosphorus oxybromide, potassium perchlorate, potassium persulfate, silver perchlorate, sodium perchlorate, sodium persulfate, triethylamine N-oxide, and zirconium oxynitrate. The use of these and other Lewis acids or so-called electron acceptor dopants are disclosed in the aforementioned U.S. Pat. Nos. 4,711,742 to Jen et al, and 4,872,910 to Eshleman et al, the entire disclosures of which are incorporated herein by reference. As noted previously, the preferred dopants are the alkali metal electrolyte salts, such as lithium, sodium and potassium perchlorates and persulfates, the particular salt being matched to the host complex, depending upon the host cavity and the cation atomic diameter as described previously.

The polymeric matrix constituent comprises a base oligomer system and a crosslinking agent suitable to form a resin matrix which is compatible with the conductive matrix constituent. In addition, a relatively low viscosity diluent is incorporated in the composition to function as a solvating agent for the crosslinking agent and base oligomer system. The diluent preferably is reactive with the polymeric components in the crosslinking reaction, although as described below, a non-reactive diluent which can be removed by evaporation upon application of the film, may also be employed. The base oligomer can take the form of any suitable low to intermediate oligomers of acrylic or acryloid resins of ethylenically unsaturated monoacrylate or dicarboxylic acids, e.g. substituted or unsubstituted molecular weight acrylic acid or acrylic acid ester based oligomers or the corresponding maleic acid derivatives, which can be crosslinked with the crosslinking agent under ultraviolet radiation to provide a polymeric matrix compatible with the ligand macromolecule incorporating the cation species in the guest/host relationship. As described below, preferred base oligomer systems include epoxy acrylates, polyester acrylates, silicone acrylates and urethane acrylates.

The preferred base oligomer systems are provided by oligomers containing from about 2–5 repeating monomers units or, in terms of molecular weight, having a molecular weight within the range of about 150–400, depending upon the nature of substituents, if any, on the ethylenically unsaturated acid or polycarboxylic acid. As a practical matter, the base oligomer system can take the form of an acrylic acid based oligomer of the type commonly used in radiation curable formulations. Such oligomers include epoxy acrylates, urethane acrylates, polyester acrylates, silicones acrylates and acrylated acrylics such as are described in Braithwaite et al, *Chemistry and Technology of UV and EB Formulations for Coatings, Inks and Paints*, Vol. 4, pp. 5–20 and *Radiation Curing Primer I*, Radtech International North America, pp. 44–50, the entire disclosures of which are incorporated herein by reference. As described in Radtech and Braithwaite et al, the particular oligomer system can be chosen to match the ultimately cured film with the substrate material and the application to which it is put in terms of such factors as strength and hardness, flexibility, chemical resistance and clarity of film. The base oligomer system can be modified, if desirable, through the addition of other oligomers to impart desired properties, as will be understood by those skilled in the art. For example, as disclosed in the aforementioned Radtech publication, polybutadiene or butadiene acrylnitro oligomers can be used with the base oligomer system to impart flexibility to the ultimately cured film. While applicant's invention is not to be restricted by theory, it is believed that the carboxylate groups of the oligomer system cooperate with the ether linkages of the ligand moiety employed to result in good distribution of the host/guest macromolecular system throughout the polymer film as crosslinking occurs.

While, as noted above, substituted crown ethers or other substituted polyether ligand structures can be employed in the present invention, the resulting substituted ionophores should not be of such bulk as to provide an excessive distance between the trapping cavities of the host molecules and therefore between the charged hydrophilic species. Also, as will be recognized by those skilled in the art, substituent groups should not be such as to disturb the basic lipophilic nature of the ionophore as it is distributed within the polymeric network. For example, highly polar substituents should be avoided. Thus, it will be recognized that highly substituted ligand structures which produce excessive distances between the host ionophores and therefore between the cationic guest moiety should be avoided. Thus, while substituted crown ethers such as benzo-15-crown-5 or dibenzo-15-crown-5 may be employed. The corresponding highly substituted crown ether such as tetrabenzo-15-crown-5 or pentabenzo-15-crown-5 should usually be avoided since these may lead to extensive intercavity distances within the polymeric matrix. Similarly, where more than one substituent group is present, the substituent groups are preferably in a roughly symmetrical relationship as described previously.

Relationships involving the intercavity distance and the average cavity diameter of the host ionophore can be developed based upon knowledge of the molecular dimensions of the ligand structure involved. Thus, for similar systems where the host ionophore is an unsubstituted crown ether, such as 18-crown-6, the intercavity distance of the ligand structure will be substantially less than the case where the host ionophore is provided by the corresponding crown ether which is highly substituted as in the case of hexabenzo-18-crown-6. In each case the average cavity diameter will be approximately the same, about 2.9 Å in the above illustration. However, the intercavity distance, which can be no smaller than the outer dimension of the crown ether, will be much smaller for the unsubstituted crown ether, than for the corresponding substituted moiety.

As noted previously, the ratio of the guest added entity and the crown ether can be varied in order to tailor the composition to provide for the desired conductive properties of the ultimately cured film. In the simplest case, the mole ratio of the cation to the crown ether will be 1:1. This configuration obtains where the cation size and the crown ether cavity are such as to allow for a relatively snug fit of the guest entity within the host molecule. Such ratios result where the cation is lithium and the crown ether is 12-crown-4 or where the cation is a potassium ion and the crown ether is 18-crown-6. Another configuration is a guest/host ratio of 1:2, resulting from a so-called "sandwich complex" in which each cationic guest is complexed between two crown ethers which have cavity diameters somewhat smaller than the cationic guest. This complex may result where the cation is a potassium ion and the crown ether is a 15-crown-5 crown ether. Other similar complexes may be formed from sodium and 14-crown-4 and rubidium and dibenzeno-18-crown-6. The reverse situation, where the cation/crown ether mole ratio is 2:1 results from the situation in which the host diameter is large enough to complex with two cations. An example here is a sodium salt complexed with dicyclohexano-24-crown-8 crown ether. Here, two sodium ions are encapsulated, each coordinated with three donor atoms of the crown ether. Another situation in which the cation is larger than the host cavity diameter is a so-called "club sandwich complex" in which two crown ethers are "sandwiched" between an intermediate and outer cations to provide a cation-ionophore ratio of 3:2 such as with a cesium ion and dibenzo-18-crown-6. The foregoing relationships may be generalized by stating that the guest cation/host crown ether ratio is within the range of 1:2 to 2:1. For a further description of crown ether complexes resulting from various spacial relationship between the crown ethers and the cationic guests, reference is made to the aforementioned Vogtle et al publication and particularly the section entitled, "Crown Ethers as Cation Receptors," appearing at pages 18–21.

As can be seen from the previous discussion, the choice of the dopant moiety and the host ionophore are interrelated in terms of the cavity diameter and diameter of the cation. Crown ethers are the preferred ligand structures and of these, it will usually be preferred to employ a crown ether having an average cavity diameter within the range of 1.2–3.2 Å. The preferred cationic species is an alkali metal selected from the group consisting of lithium, sodium and potassium ions, as noted previously, which will have an average cation diameter slightly less than the cation diameter of the ligand structure. Cavities diameters and ionic diameters in angstroms of various crown ethers and cations are listed below in Tables I and II, respectively.

TABLE I

|  | Diameter (Å) |
| --- | --- |
| 12-Crown-4 | 1.2–1.5 |
| 14-Crown-4 | 1.2–1.5 |
| 15-Crown-5 | 1.7–2.2 |
| 18-Crown-6 | 2.6–3.2 |
| 21-Crown-7 | 3.4–4.3 |

TABLE II

|  | Diameter (Å) |
| --- | --- |
| $Li^+$ | 1.20 |
| $Na^+$ | 1.90 |
| $Ag^+$ | 2.52 |
| $K^+$ | 2.66 |
| $BA^{+2}$ | 2.70 |
| $NH_{4+}$ | 2.84 |
| $Rb^+$ | 2.96 |
| $CS^+$ | 3.34 |

The crosslinking agent can take the form of any suitable low viscosity multi-functional monomer oligomer which is reactive with the base oligomer system and which functions as a crosslinking agent in the presence of the photoinitiators described below under irradiation with ultraviolet light in the appropriate region or regions. Suitable crosslinking agents for acrylic or acryloid resins are well known to those skilled in the art and can be employed in carrying out the present invention. The crosslinking agent, as noted previously, should be a multifunctional monomer (or possibly dimer or trimer), which has a relatively low viscosity relative to the base oligomer system. By way of example, where the base oligomer system may have a room temperature viscosity of about 5,000–25,000 cps, the crosslinking agent should have a viscosity within the range of about 500–2,500 cps, preferably no more than 10% of the viscosity of the base oligomer system. Suitable crosslinking agents for use in conjunction with the preferred acrylic acid or acrylate ester base oligomer system include 1.6-hexanediol diacrylate, diethylene glcyol diacrylate, dipentaerythritol tetraacrylate, ethoxylated pentaerythritol tetraacrylate, pentaerythritol triacrylate, pentaerythritol tetraacrylate, trimethylolpropane triacrylate, trimethylolpropane trimethacrylate, tris (2-hydroxy ethyl)isocyanurate trimethacrylate, and tris (2-hydroxy ethyl) isocyanurate triacrylate.

The diluent is employed in the present invention to provide good solubilization and intermixing of the base oligomer system and the crosslinking agent. The diluent is a solvent of a relatively low viscosity, typically within the range of 50–250 cps and preferably about 1–2% of the viscosity of the base oligomer system and less than the viscosity of the crosslinking agent. The diluent system is preferably reactive, i.e. enters into the crosslinking reaction, with the base oligomer and the multifunctional monomer although under appropriate circumstances non-reactive diluents may be employed. A suitable non-reactive diluent for use in the present invention is an amphillic solvent such as isopropyl alcohol, propanol or isoamyl alcohol. The lower molecular weight alcohols are preferred as a non-reactive diluents; as the film is solidified the alcohol is evolved through evaporation.

The reactive diluents may be characterized as monofunctional monomers or multifunctional monomers. The former may have viscosities ranging from one cp or less up to about 75 cps whereas the multifunctional monomers may typically exhibit viscosities up to about 1,000 cps. Non-reactive diluents such as alcohols can be expected to have very low viscosities. For a further description of such diluents, reference is made to Volume 2 of the aforementioned *Chemistry & Technology of UV & EB Formulations for Coatings, Inks and Paints*, "Prepolymers and Reactive Diluents for UV and EB Curable Formulations", particularly pages 240, 280–283 (including specifically, Table III for properties of monofunctional monomers and Table IVA for properties of multifunctional monomers) and 304–305, the entire disclosure of which is incorporated herein by reference.

Preferably, the diluent employed in the present invention is a reactive diluent which is a monofunctional monomer compatible with the base oligomer system and crosslinking agent and enters into the polymerization reaction leading to the resin film. The use of a reactive diluent is advantageous, since it does not seriously impede the conductivity of the final film and need not be removed by evaporation or the like since it enters into the crosslinked polymer matrix. Suitable reactive diluents for use with the preferred acrylic acid or acrylate ester base oligomer systems of the present invention include acrylic acid, isobornyl acrylate, isodecyl acrylate, isooctyl acrylate, N-vinylpyrrolidone, ethoxyethyl acrylate, phenoxyethyl acrylate, tetrahydrofurfuryl acrylate, and tetrahydrofurfuryl methacrylate.

The photoinitiators employed in the present invention function in response to applied ultraviolet radiation functions to produce free radicals or cations which propagate the polymerization reaction involved. As will be recognized by those skilled in the art, the polymerization involved in forming the cured solid product from the applied liquid monomer/oligomer phase would be characterized as free radical polymerization or cationic polymerization. Both free radical and cationic initiators can be employed throughout the three regions of the ultraviolet spectrum, that is the UV-A region (having a wavelength of about 315–400 nm), UV-B region (having a wavelength of about 280–315 nm) and UV-C region (having a wavelength of about 200–280 nm). The predominately used ultraviolet light sources in radiation curing are medium pressure mercury lamps having the predominate energy band at roughly the middle of the UV-A region with a secondary energy band at the upper end of the UV-B region. Thus, the preferred formulations employed in the present invention will be curable within a relatively short timespan as described below by ultraviolet radiation in the UV-A region, optionally extending into the UV-B region, although electromagnetic radiation throughout the ultraviolet wavelengths can be employed.

Suitable photoinitiators of both the free radical and cationic type are used with oligomer/monomer/reactive diluent systems as described in the aforementioned Radtech publication at pp. 49–53 and in Chang et al, *Acta Physica Sinica (Overseas Edition)*, Vol. 2, No. 11, Science Press, November 1993 at pages 18–20, the entire disclosures of which are incorporated herein by reference. As described there, the most commonly used free radical initiators include benzophenone and derivatives thereof, whereas the most commonly used cationic photoinitiators are aryl (or alkylaryl), sulfonium salts which yield acid catalysts upon the application of ultraviolet lights. Suitable photoinitiators for use in the present invention include alpha hydroxy ketone, benzyldimethyl ketal, benzophenone, ethyl 4-(dimethylamino) benzoate, isopropylthioxanthone, various trialkyl benzophenones such as trimethylbenzophenone and various other diphenyl ketones such as 2,2-dimethoxy-2-phenylacetophenone. Other photoinitiators are disclosed in U.S. Pat. Nos. 3,715,293 and 3,801,329 to Sandner et al, the entire disclosures of which are incorporated herein by reference.

A final component for use in the present invention is a compatible adhesion promoter which can cause the film, once formed and cured, to adhere to the substrate surface. The adhesiveness of a formulation and manners by which it can be enhanced are described in the aforementioned Vol. 4 of Braithwaite et al at pp. 34–40, the entire disclosure of which is incorporated herein by reference. Suitable adhesion promoters which are compatible with acrylate type oligomer systems are well known to those skilled in the art and include β-carboxyethyl acrylate, aliphatic monofunctional esters, aliphatic difunctional esters, alkoxylate, diacrylate esters, alkoxylated trifunctional acrylates, octyl/decyl acrylate, oxyethylated phenol acrylate and trifunctional acrylate esters.

The principal application of the present invention will be in the application of adhered films to substrate surfaces. Here, the thickness of the finally cured film normally will be within the range of 10–100 microns and as noted previously normally will be transparent to visible light so that the underlying substrate surface can be observed. The thickness of the film of the final product will, of course, depend upon the thickness of the applied uncured film which in turn will depend upon the viscosity of the applied liquid formulation. Normally, the viscosity of the formulation will be within the range of 100–1,000 cp. In most cases, it would be preferred to provide a viscosity of the formulation as applied to the substrate within the range of 100–500 cps. Normally, the polymer film will be cured to a hardset under the applied ultraviolet light within a time interval of 5 seconds to 3 minutes. Relatively rapid curing is desirable under the application of the less energetic radiation in the A region and the adjacent portion of the B region. The energy level of the applied ultraviolet radiation as determined by its wavelength and energy of the applied radiation per unit time and quantity of applied film, will determine the cure time. Preferably the applied film at a thickness of 10 um can be cured at an applied power of 180 milliwatts per $cm^2$ at a time within the range of 5 seconds to 3 minutes. This, as noted previously, should be accomplished in providing a film which is transparent to visible light. The viscosity of the applied liquid film will be a factor, as indicated previously, in determining the thickness of the film. Usually, the viscosity will be within the range of 100–1,000 cp, and more specifically, within the range of 100–500 cps to provide a film having a thickness within the range of 10–50 microns for most substrates. As will be recognized by those skilled in the art, the viscosity of the formulation will be controlled depending upon the nature and amount of the base oligomer system, the multi-functional low viscosity crosslinking agent and the reactive diluent. The conductive matrix constituent which will form a relatively small amount of the overall film forming composition usually will not have a substantial affect upon the viscosity. The conductive matrix constituent normally will be present in the overall formulation in an amount within the range of 5–15 wt. % with the cationic moiety forming the major component part of the conductive matrix substituent. By way of example, where a crown ether such as 12-crown-4, 15-crown-5 or 18-crown-6 is employed with an alkali metal salt such as a perchlorate or persulfate, the dopant will usually be employed in an amount providing a ratio to the crown ether or other ligand component in a molar ratio of at least 1:1.

In general, the base oligomer system will be the predominant and in some cases even the major component of the formulation followed by the crosslinking agent, diluent, and photoinitiator in relatively minor amounts. The total conductive matrix constituent, the crown ether or other macromolecule and dopant, will also be present in a minor amount as noted previously. Small amounts of other additives may also be employed in the formulation of the present invention. For example, surface active agents can be added in order to enhance the wettability of the liquid formulation on the substrate surface.

For most applications, the base oligomer system will be present in an amount in the formulation within a range of 10–50 wt. % followed by the multifunctional crosslinking agent in an amount within the range of 5–20 wt. %. The amount of reactive diluent will depend upon the viscosities of the first two components but will normally will be present in an amount within the range of 30–40 wt. % with the photoinitiator present in an amount within the range of 4–10 wt. %. The adhesion promotor which usually will be employed will be present in an amount within the range of 4–10 wt. %. The conductive matrix constituent will be present in the overall formulation in an amount within the range of 5–15 wt. % with, as noted above, the crown ether or other host component present in a minor amount. Typically, the host cryptand, podand or coronand and the dopant will be present in equal molar amounts.

A preferred formulation for use in carrying out the present invention has the composition as set forth in the following Table III. In this table, the common commercial designations for the components are given as well as the nature of the components themselves. Where appropriate, the functions and characteristics of the components are set forth parenthetically.

TABLE III

| Component | | wt. % |
|---|---|---|
| PEG 610 | Polyethylene glycol diacrylate (Difunctional acylic monomer 600 mw) | 22.56 |
| PEG 400 | Polyethylene glycol diacrylate (Difunctional acrylic monomers 400 mw) | 15.64 |
| DVE-3 | Triethylene glycol divinyl ether (Reactive diluent for acrylate oligomers Difunctional crosslinker) | 4.00 |
| SR 285 | Tetrahydrofurfuryl acrylate (Monofunctional monomer-99% reactive esters. Reactive diluent, low shrink, adhesion and abrasion resistance promoter) | 9.32 |
| SR 339 | Phenoxyethyl acrylate (Monofunctional monomer-Reactive diluent, low shrinkage, adhesion, flexibility and scratch resistance) | 5.59 |
| CD 504 | Ethoxylated nonyl-phenol acrylate (Monofunctional monomer-99% reactive esters, wetting agent and coupling agent for different polarities) | 2.34 |
| FC 430 | Fluoroaliphatic polymeric copolymer (Fluorosurfactant-Wetting agent) | 0.75 |
| BYK 300 | Polyether modified dimethylpolysiloxane copolymer (Outgassing agent) | 0.75 |
| β-CEA | Beta carboxyethyl acrylate (Monomer-mixture of acrylated carboxylic acid functionality, adhesion promoter) | 3.61 |
| PETA K | Pentaerythritol triacrylate (Pentafunctional monomer-Provides high crosslink density, chemical resistance and hard finish) | 9.32 |
| CN 963A80 | Aliphatic urethane acrylate (80:20 hard non-yellowing urethane resin:TPGDA) | 9.50 |
| Darocure 4265 | Free radical polymerization of unsaturated resins. 50:50. 2-hydroxy-2-methyl-1-phenyl propanol-1-one:2,4,6-trimethylbenzoyldiphenylphosphine oxide) | 7.12 |

TABLE III-continued

| Component | | wt. % |
|---|---|---|
| FX 512 | UV activated epoxy curative (Aromatic sulfonium compound) | 0.10 |
| LiClO$_4$ | Lithium Perchlorate (Acts as the guest in a host/guest relationship with the crown ether. Conductivity occurs via the transference of charge between the unpaired oxygen electrons of the host and the cation of the guest) | 8.40 |
| 12-Crown-4 | (Acts as the host in a host/guest relationship with the cation) | 1.00 |

As discussed previously other preferred embodiments of the invention are those incorporating functionalized coronands and functionalized podands. A composition corresponding to that shown above in Table III but employing a functionalized coronand can be formulated by replacing the 12-crown-4 and the PEG 610 with the corresponding amount (23.56 wt. %) of 12-crown-4 hydroxymethylacrylate.

Another suitable formulation for use in carrying out the present invention has the following components as set forth in Table IV:

| | |
|---|---|
| β-Carboxyethyl acrylate | 6.0 |
| 2-Phenoxyethyl acrylate | 6.0 |
| Benzyldimethyl ketal | 5.0 |
| Benzophenone | 5.0 |
| Fluorinated surfactant | 0.5 |
| Pentaerythritol | 6.0 |
| Polyethylene glycol (400 mw) | 20.0 |
| Polyethylene glycol (600 mw) | 36.0 |
| Silicone surfactant | 0.3 |
| Urethane acrylate | 10.0 |
| 12-Crown-4 | 0.4 |
| LiClO$_4$ | 4.8 |

This formulation has a viscosity of less than 1,000 cps and readily adheres to most metal, wood or plastic surfaces. It can be sprayed on to provide a film having a thickness of about 2–4 mils. Under application of a medium range ultraviolet mercury lamp having electromagnet radiation predominately in the A region at a rate of 180 milliwatts per cm$^2$, the film will cure in about 5–180 seconds.

Other formulations preferred for use in the present invention include those incorporating lithium salts selected from the group consisting of lithium triflate, lithium thiocyanate and lithium trifluoroacetate as well as the lithium perchlorate as disclosed in the above formulations. Here, the ratio of the "base formulation", the formulation exclusive of the salt, to the salt typically will range from about 9:1 to 4:1 base:salt.

Having described specific embodiments of the present invention, it will be understood that modifications thereof may be suggested to those skilled in the art, and it is intended to cover all such modifications as fall within the scope of the appended claims.

What is claimed:

1. In a U.V. curable composition for application to a substrate surface to provide a static dissipative coating comprising:

(a) a conductive matrix constituent comprising a crown type ligand selected from the group consisting of podands, coronands and cryptands in a guest/host relationship with a conductive dopant moiety;

(b) a polymer matrix constituent comprising a base oligomer system and a crosslinking agent reactive with said base oligomer system to form a thermoset resin matrix incorporating said conductive matrix constituent;

(c) a low viscosity diluent of a lower viscosity than said base oligomer system and functioning as a solvating system for said crosslinking agent and said base oligomer system; and (d) a photoinitiator component effective to provide a free radical or cationic source to initiate polymerization of said composition in the presence of electromagnetic radiating in the ultraviolet range to provide a cured time of no more than one-half minute.

2. The composition of claim 1, further comprising an adhesion promoter compatible with said base oligomer system to cause said cured polymer structure to be adhered to a solid substrate surface.

3. The composition of claim 1 wherein said diluent is reactive with said base oligomer system and said crosslinking agent.

4. The composition of claim 1, further comprising a surface active agent effective to decrease the liquid solid interfacial tension of said formulation when applied to a solid substrate surface.

5. The composition of claim 1, wherein said crown type ligand is a coronand in a guest/host relationship with an alkali metal cation selected from the group consisting of lithium, sodium and potassium.

6. The composition of claim 5, wherein said coronand is a crown ether.

7. The composition of claim 6, wherein said crown ether has an average cavity diameter within the range of 1.2–3.2 Å.

8. The composition of claim 7, wherein said alkali metal ion has an average cation diameter which is less than said average cavity diameter of said crown ether.

9. The composition of claim 6, wherein said crown ether has an average cavity diameter within the range of 1.2–3.2 Å and wherein said cationic moiety has an average cation diameter less than that of said average cavity diameter.

10. The composition of claim 9, wherein said base oligomer system comprises an acrylate oligomer in a minor amount in a mixture with a liquid polyether glycol selected from the group consisting of polyethylene glycol and polypropylene glycol.

11. The composition of claim 10, wherein said conductive matrix is formed by doping with an alkali metal persulfate or perchlorate selected from the group consisting of lithium perchlorate, lithium persulfate, sodium perchlorate, sodium persulfate, potassium perchlorate and potassium persulfate.

12. The composition of claim 1, wherein said base oligomer system is selected from the group consisting of an epoxy acrylate, a polyester acrylate, a silcone acrylate and a urethane acrylate and mixtures thereof and said crosslinking agent is a multi-functional acrylate monomer having a viscosity lower than the viscosity of said base oligomer system.

13. The composition of claim 12, wherein said crosslinking agent is a multi-functional diacrylate, triacrylate or tetraacrylate.

14. The composition of claim 13, wherein said diluent is a mono-functional acrylate reactive with said base oligomer system and said crosslinking agent.

15. The composition of claim 14, wherein said crown type ligand is a coronand in a guest/host relationship with an alkali metal ion selected from the group consisting of lithium, sodium and potassium.

16. The composition of claim 15, wherein said coronand is a crown ether having from 4–6 donor oxygen atoms.

17. The composition of claim 16, wherein said crown ether is selected from the group of unsubstituted crown ethers or mono- or di-substituted cycloalkyl or aromatic substituted crown ethers.

18. The composition of claim 1, wherein said crown type ligand is an acrylate functionalized podand or coronand.

19. The composition of claim 18, wherein said ligand is an acrylate functionalized crown ether.

20. The composition of claim 19, wherein said acrylate functionalized crown ether is a monofunctionalized crown ether.

21. The composition of claim 19, wherein said crown ether is a difunctionalized crown ether.

22. The composition of claim 1, wherein said coronand is a crown ether having from 4 to 6 donor oxygen atoms in a guest/host relationship with an alkali metal cation which the guest ion/host ratio is within the range 1:2 to 2:1.

23. The composition of claim 22, wherein said alkali metal ion is selected from the group consisting of lithium, sodium and potassium.

24. The composition of claim 22, wherein the cation/crown ether ratio is 1:1.

25. The composition of claim 22, wherein said cation crown ether ratio is 1:2 to provide a sandwich complex in which a cation guest is complexed between two crown ethers.

26. The composition of claim 22, wherein said cation/crown ether mole ratio is 2:1 to provide a complex in which two cations are complexed in one crown ether.

27. The composition of claim 22, wherein said cation crown ether ratio is 3:2 to provide a club sandwich complex in which two crown ethers are complexed with three cations.

28. In a method for producing a static dissipative surface, the steps comprising:

(a) providing a clear coating liquid comprising a conductive matrix constituent having a crown type ligand selected from the group consisting of podands, coronands and cryptands in a guest/host relationship with a conductive dopant moiety, a polymerizable matrix constituent comprising a base oligomer system and a crosslinking agent reactive with said base oligomer system to form a thermoset resin matrix incorporating said conductive matrix constituent, a low viscosity diluent which functions as a carrier liquid for said conductive matrix constituent and said polymerizable matrix constituent, and a photoinitiator component effective to provide a free radical or cationic source to initiate polymerization of said polymerizable matrix constituents in the presence of electromagnetic radiation in the ultraviolet range;

(b) applying the coating liquid of step (a) to a substrate surface to provide a film on said substrate surface; and (c) irradiating said film with ultraviolet radiation at an intensity within the range of 200–400 mw/cm$^2$ to effect crosslinking of said polymerizable matrix constituent to provide a cured transparent film on said substrate surface having a surface resistivity within the range of $10^5$–$10^{14}$.

29. The method of claim 28, wherein said coating liquid further comprises an adhesion promoter to cause said film to be adhered to said substrate surface.

30. The method of claim 28, wherein said diluent is reactive with said base oligomer system and said crosslinking agent in the crosslinking reaction induced by said ultraviolet radiation.

31. The method of claim 28, wherein said liquid formulation has a viscosity of no more than 1,000 cps.

32. The method of claim 31, wherein said coating liquid contains a surface agent effective to provide a liquid/solid interfacial tension between said coating liquid and said substrate surface of no more than 20 dynes/cm and is applied to said substrate surface by spraying said formulation through a nozzle and formulation.

33. The method of claim 28, wherein said conductive matrix constituent is a crown ether having an average cavity diameter within the range of 1.2–3.2 Å.

34. The method of claim 28, wherein said crown type ligand is an acrylate functionalized podand or coronand.

35. The method of claim 34, wherein said ligand is an acrylate functionalized crown ether.

* * * * *